(12) United States Patent
Honda et al.

(10) Patent No.: US 12,441,492 B2
(45) Date of Patent: Oct. 14, 2025

(54) AUTOMATIC PARKING LOT MANAGEMENT SYSTEM, AUTOMATIC PARKING LOT MANAGEMENT METHOD, AND STORAGE MEDIUM

(71) Applicant: TOYOTA JIDOSHA KABUSHIKI KAISHA, Toyota (JP)

(72) Inventors: Daisaku Honda, Nagoya (JP); Hiroya Matsubayashi, Nisshin (JP); Ryota Tomizawa, Mishima (JP); Satoshi Tanabe, Susono (JP); Nobutsugu Maruiwa, Mishima (JP); Yasuhiro Kobatake, Nagoya (JP); Hiroki Awano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 570 days.

(21) Appl. No.: 17/845,473

(22) Filed: Jun. 21, 2022

(65) Prior Publication Data
US 2023/0060036 A1 Feb. 23, 2023

(30) Foreign Application Priority Data

Aug. 20, 2021 (JP) ................... 2021-134995

(51) Int. Cl.
| | |
|---|---|
| *B64U 10/13* | (2023.01) |
| *B60W 30/06* | (2006.01) |
| *B64D 47/00* | (2006.01) |
| *G05D 1/00* | (2006.01) |

(52) U.S. Cl.
CPC ............. *B64U 10/13* (2023.01); *B60W 30/06* (2013.01); *B64D 47/00* (2013.01); *G05D 1/101* (2013.01)

(58) Field of Classification Search
CPC ........ B60W 30/06; B64D 47/00; B64U 10/13; G05D 1/101
See application file for complete search history.

(56) References Cited

U.S. PATENT DOCUMENTS

| | | | |
|---|---|---|---|
| 2018/0061148 A1 | 3/2018 | Dudar et al. | |
| 2019/0066503 A1* | 2/2019 | Li | ............ G08G 5/0013 |
| 2020/0047768 A1 | 2/2020 | Hamada | |
| 2020/0074859 A1 | 3/2020 | Eshima | |
| 2021/0009111 A1* | 1/2021 | Kang | ............ B60W 60/0051 |
| 2021/0295402 A1* | 9/2021 | Noguchi | ............ H04W 4/021 |

FOREIGN PATENT DOCUMENTS

| | | |
|---|---|---|
| CN | 107792049 A | 3/2018 |
| CN | 110392907 A | 10/2019 |
| CN | 110816539 A | 2/2020 |
| CN | 112562408 A | 3/2021 |
| JP | 2020-035071 A | 3/2020 |

* cited by examiner

*Primary Examiner* — Luke Huynh
(74) *Attorney, Agent, or Firm* — Sughrue Mion, PLLC

(57) ABSTRACT

An automatic parking lot management system includes an infrastructure sensor for detecting a preset range in a parking lot. A mobile body including a peripheral detection sensor is used, and the mobile body is able to be moved to a detectable position at which the peripheral detection sensor of the mobile body is able to detect a detection range of the infrastructure sensor. When determination is made that there is an abnormality in the infrastructure sensor, the mobile body is moved to the detectable position to cause the peripheral detection sensor to detect the detection range of the infrastructure sensor.

7 Claims, 11 Drawing Sheets

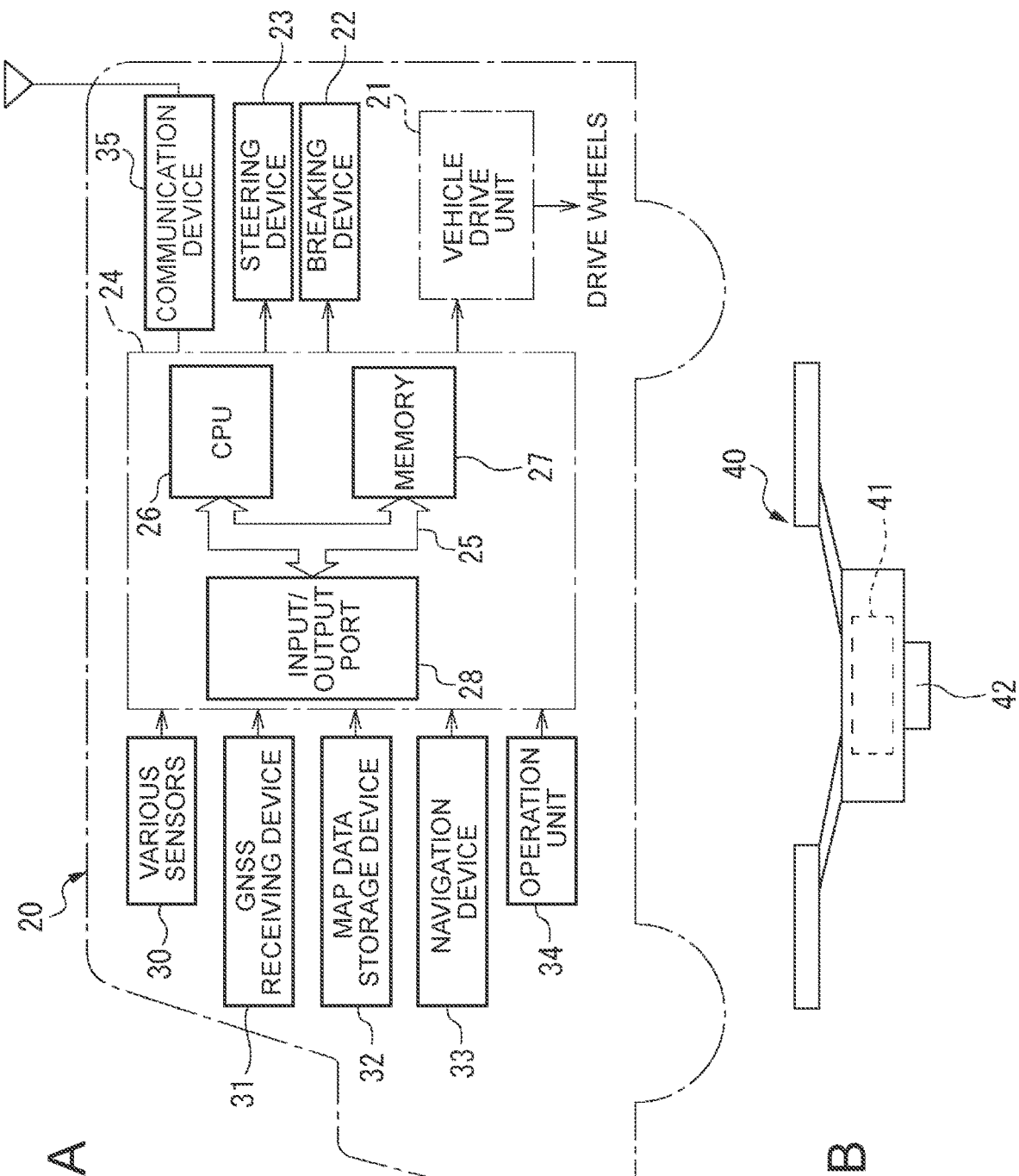

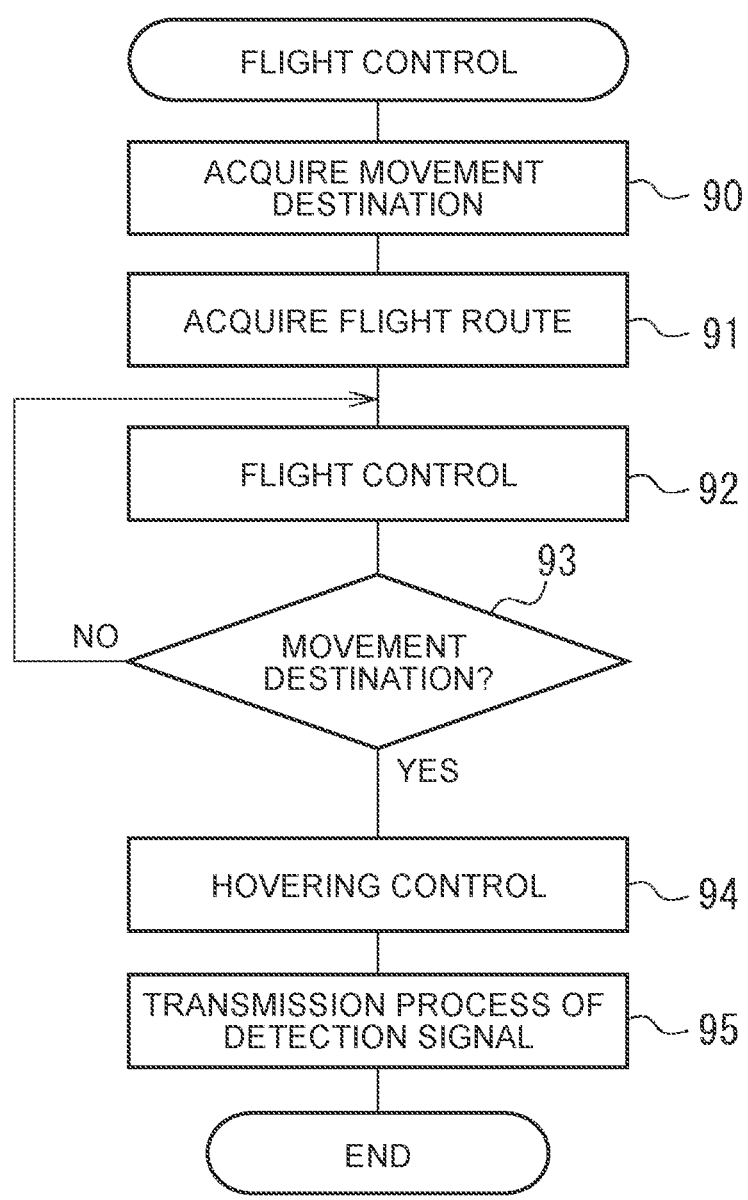

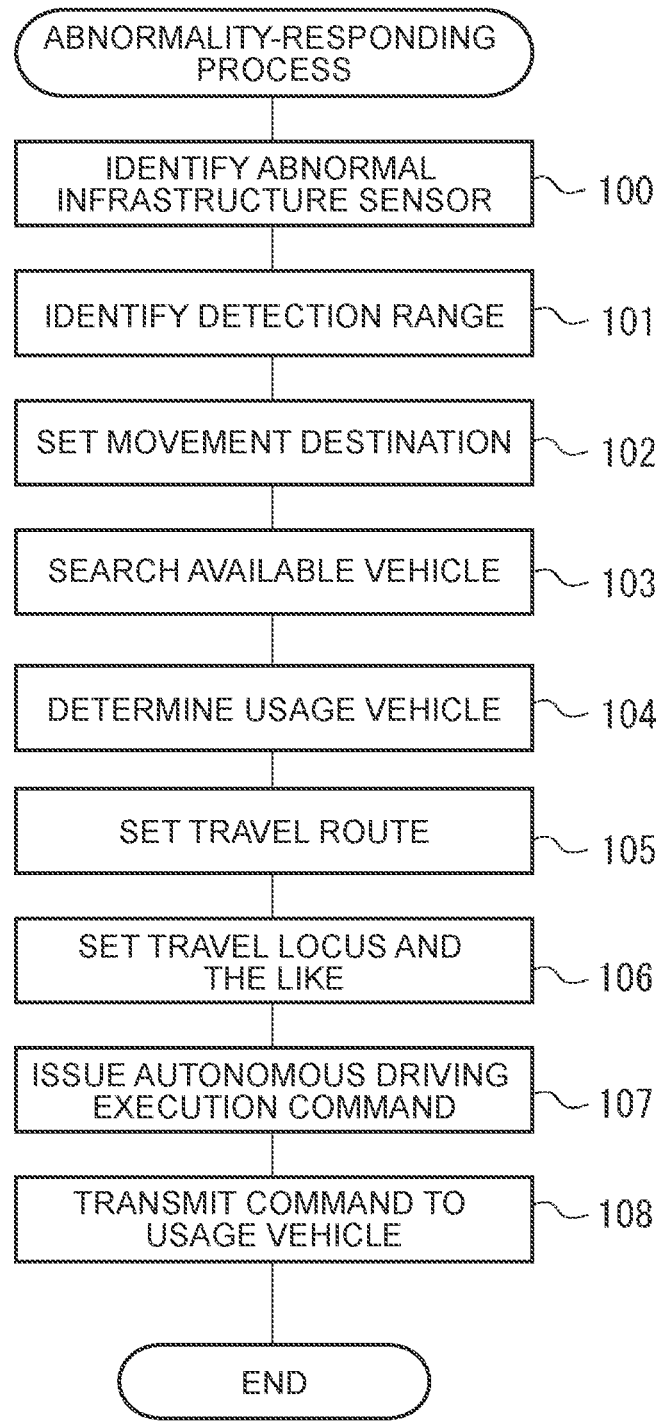

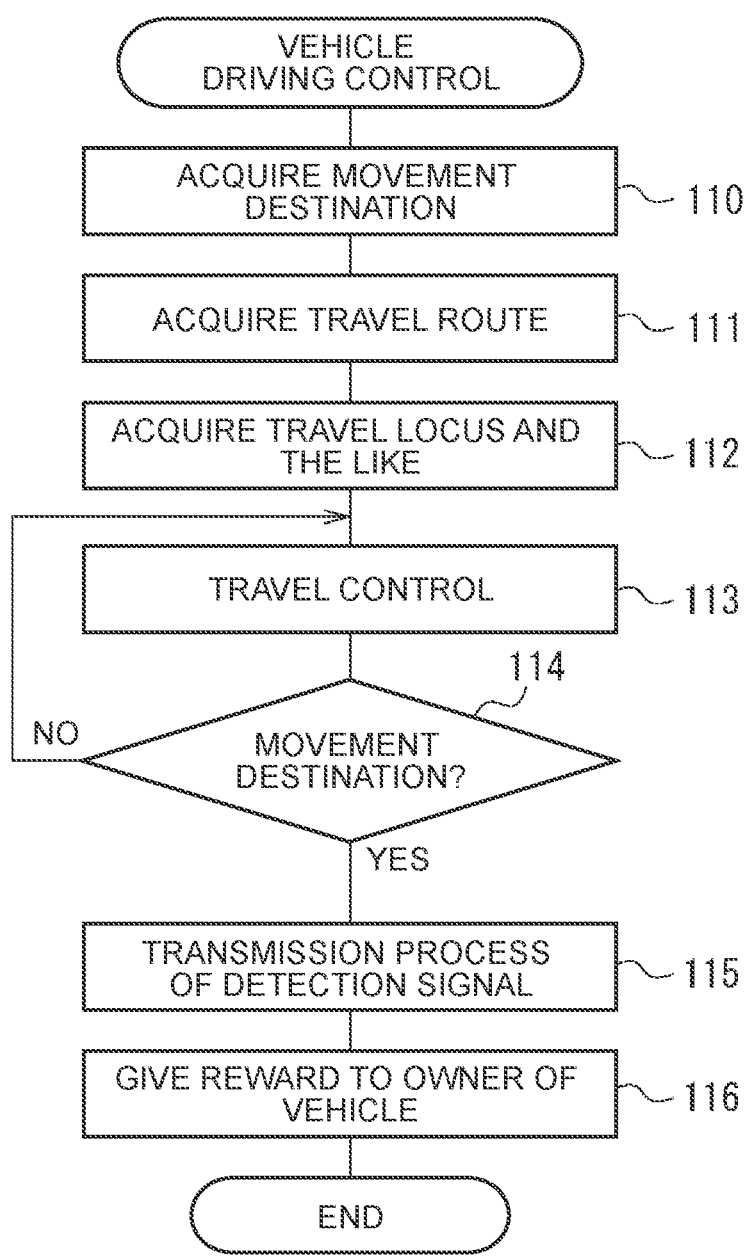

AUTOMATIC PARKING LOT MANAGEMENT SYSTEM, AUTOMATIC PARKING LOT MANAGEMENT METHOD, AND STORAGE MEDIUM

CROSS-REFERENCE TO RELATED APPLICATION

This application claims priority to Japanese Patent Application No. 2021-134995 filed on Aug. 20, 2021, incorporated herein by reference in its entirety.

BACKGROUND

1. Technical Field

The present disclosure relates to an automatic parking lot management system, an automatic parking lot management method, and a storage medium.

2. Description of Related Art

In an automatic parking system for an autonomous vehicle, an automatic parking system is known in which an infrastructure sensor that can detect the state of a parking lot, for example, a camera that can capture an image of the inside of the parking lot is installed, and based on the image captured by the camera, a travel route for a vehicle that enters and leaves the parking lot is calculated (see, for example, Japanese Unexamined Patent Application Publication No. 2020-35071 (JP 2020-35071 A)).

SUMMARY

However, in this automatic parking system, there is a problem that when an abnormality occurs in the infrastructure sensor, it becomes difficult to calculate the travel route for the vehicle that enters and leaves the parking lot, and an automatic parking service has to be stopped.

In order to solve such a problem, according to the present disclosure, an automatic parking lot management system is provided.

An automatic parking lot management system includes an infrastructure sensor for detecting a preset range in a parking lot, in which a mobile body including a peripheral detection sensor is used, and the mobile body is able to be moved to a detectable position at which the peripheral detection sensor of the mobile body is able to detect a detection range of the infrastructure sensor.

The automatic parking lot management system further includes an abnormality detection unit for detecting an abnormality in the infrastructure sensor, and an alternative detection execution unit for moving the mobile body to the detectable position to cause the peripheral detection sensor to detect the detection range of the infrastructure sensor when the abnormality in the infrastructure sensor is detected.

Further, according to the present disclosure, an automatic parking lot management method is provided.

The automatic parking lot management method includes detecting an abnormality in an infrastructure sensor for detecting a preset range in a parking lot, in which a mobile body including a peripheral detection sensor is used, and the mobile body is able to be moved to a detectable position at which the peripheral detection sensor of the mobile body is able to detect a detection range of the infrastructure sensor, and moving the mobile body to the detectable position to cause the peripheral detection sensor to detect the detection range of the infrastructure sensor when the abnormality in the infrastructure sensor is detected.

Further, according to the present disclosure, a storage medium storing a program for controlling an automatic parking lot management system is provided, the automatic parking lot management system including an infrastructure sensor for detecting a preset range in a parking lot, in which a mobile body including a peripheral detection sensor is used, and the mobile body is able to be moved to a detectable position at which the peripheral detection sensor of the mobile body is able to detect a detection range of the infrastructure sensor, the storage medium storing the program causing a computer to move the mobile body to the detectable position to cause the peripheral detection sensor to detect the detection range of the infrastructure sensor when an abnormality in the infrastructure sensor is detected.

It is possible to continuously provide an automatic parking service.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4A is a diagram graphically illustrating a vehicle;

FIG. 4B is a diagram graphically illustrating a drone;

FIG. 10 is a flowchart for performing flight control;

FIG. 11 is a flowchart for executing still another embodiment of the abnormality-responding process; and FIG. 12 is a flowchart for performing vehicle driving control.

DETAILED DESCRIPTION OF EMBODIMENTS

Figure 1:
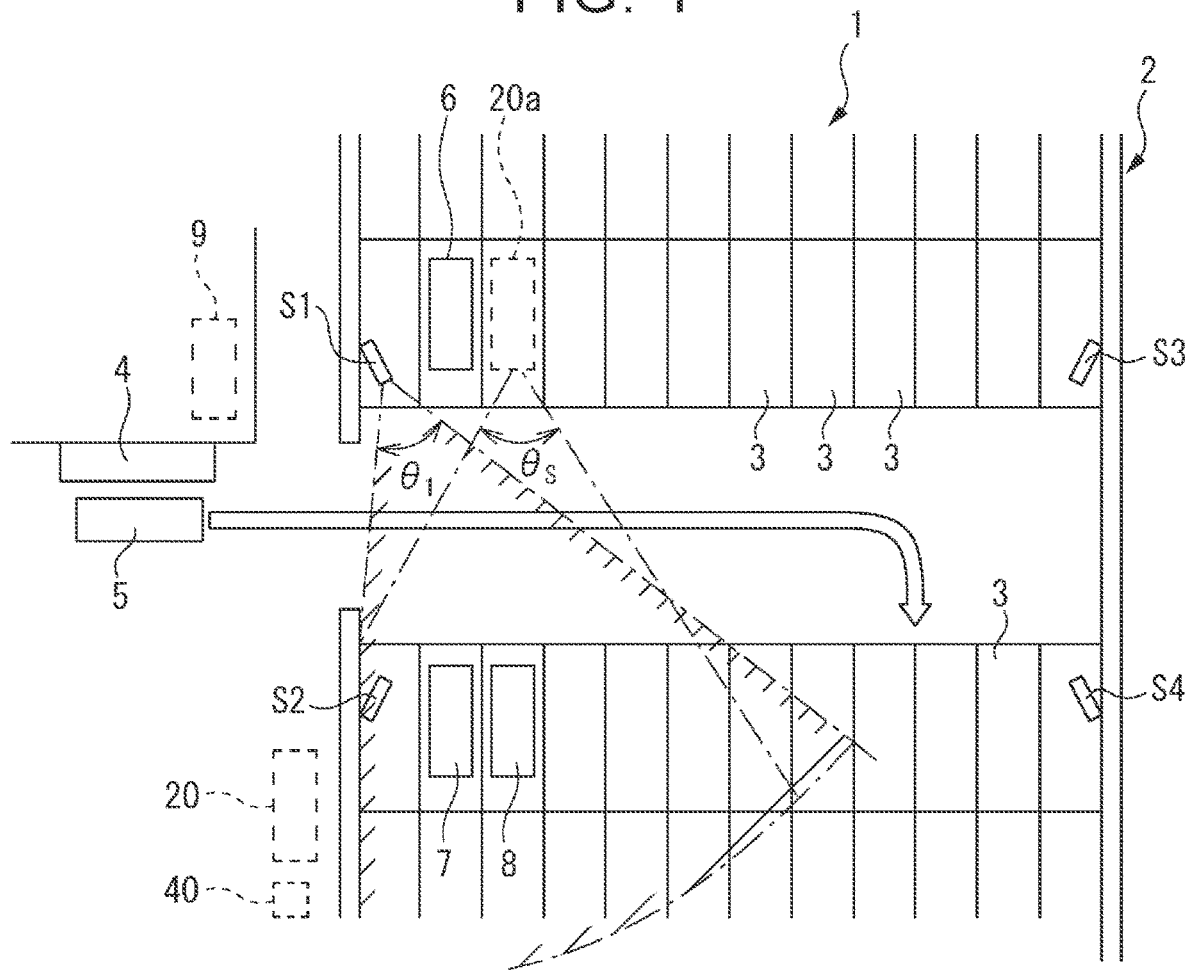
FIG. 1 is a plan view graphically illustrating an example of an automatic parking lot.
Figure 2:
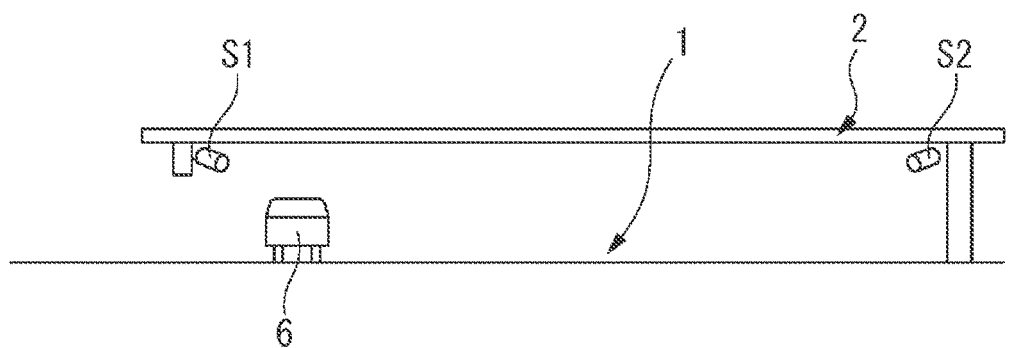
FIG. 2 is a side view of the automatic parking lot shown in FIG. 1.

FIG. 1 is a plan view graphically illustrating only a part of an automatic parking lot, and FIG. 2 is a side view of the automatic parking lot shown in FIG. 1. Referring to FIGS. 1 and 2, the numeral 1 indicates a parking lot, the numeral 2 indicates an automatic parking lot building, the numeral 3 indicates multiple parking spaces, the numeral 4 indicates a boarding and alighting place, the numeral 5 indicates an autonomous vehicle stopped at the boarding and alighting place 4, and the numerals 6, 7, and 8 indicate autonomous vehicles parked in the parking spaces 3 in the parking lot 1. In this parking lot 1, an automatic parking service, that is, an automated valet parking service is performed in which the autonomous vehicle 5 that has reached the boarding and alighting place 4 is autonomously driven to an empty parking space 3, and the autonomous vehicles 6, 7, and 8 parked in the parking spaces 3 are autonomously driven to the boarding and alighting place 4. On the other hand, in FIG. 1, the numeral 9 indicates an entry and leaving management server that is located at a parking management facility and that manages entry and leaving of the vehicle. In this automatic parking lot, a manually driven vehicle can also be parked.

In a case where a user who uses this automatic parking service parks an own vehicle in the parking lot 1, for example, when the own vehicle reaches the boarding and alighting place 4, for example, the user transmits an entry request together with a vehicle identification (ID) for identifying the own vehicle to the entry and leaving management server 9 via a communication network from a mobile terminal of the user. Upon receiving the entry request, the entry and leaving management server 9 sets a travel route for the vehicle such that the vehicle can reach the empty parking space 3 from the boarding and alighting place 4 without coming into contact with other vehicles and pedestrians, and transmits the set travel route to the vehicle of the user. When the vehicle of the user receives the set travel route from the entry and leaving management server 9, the vehicle of the user performs autonomous driving along the set travel route to be moved from the boarding and alighting place 4 to the empty parking space 3.

On the other hand, the same applies when the vehicle leaves the parking lot 1. For example, when the user arrives at the boarding and alighting place 4, the user transmits a leaving request together with the vehicle ID for identifying the own vehicle to the entry and leaving management server 9 via the communication network from the mobile terminal of the user. Upon receiving the leaving request, the entry and leaving management server 9 sets a travel route for the vehicle such that the vehicle can reach the boarding and alighting place 4 from the parking space 3 where the vehicle is parked without coming into contact with other vehicles and pedestrians, and transmits the set travel route to the vehicle of the user. When the vehicle of the user receives the set travel route from the entry and leaving management server 9, the vehicle of the user performs autonomous driving along the set travel route to be moved from the parking space 3 where the vehicle is parked to the boarding and alighting place 4.

In the automatic parking lot, a large number of infrastructure sensors are normally arranged in order to detect the parking situation of a vehicle in the parking lot or to set the travel route for the vehicle. FIGS. 1 and 2 each illustrate a part of the area in the automatic parking lot, and in the example shown in FIGS. 1 and 2, a case is shown in which four infrastructure sensors S1, S2, S3, and S4 are installed in order to detect the state of the part of the area in the automatic parking lot. A camera, a laser sensor, or the like can be used as the infrastructure sensors S1, S2, S3, and S4, but a case in which a camera is used as the infrastructure sensors S1, S2, S3, and S4 will be described below as an example. That is, a case in which the image of the inside of the parking lot 1 is captured by the infrastructure sensors S1, S2, S3, and S4 will be described as an example.

The infrastructure sensor S1 among the infrastructure sensors S1, S2, S3, and S4 will be described. As shown in FIG. 2, the infrastructure sensor S1 is installed at a position higher than that of the vehicle 6. Further, referring to FIG. 1, the detectable angle range of the infrastructure sensor S1 when viewed from above is indicated by $\theta_1$, and the area surrounded by the band-shaped diagonal line portion in FIG. 1 is a detection range of the infrastructure sensor S1 when viewed from above. Note that in FIG. 1 the detectable angle ranges of the other infrastructure sensors S2, S3, and S4 and the detection ranges of the other infrastructure sensors S2, S3, and S4 are not shown. On the other hand, the image signals captured by the infrastructure sensors S1, S2, S3, and S4 are transmitted to the entry and leaving management server 9.

Figure 3:
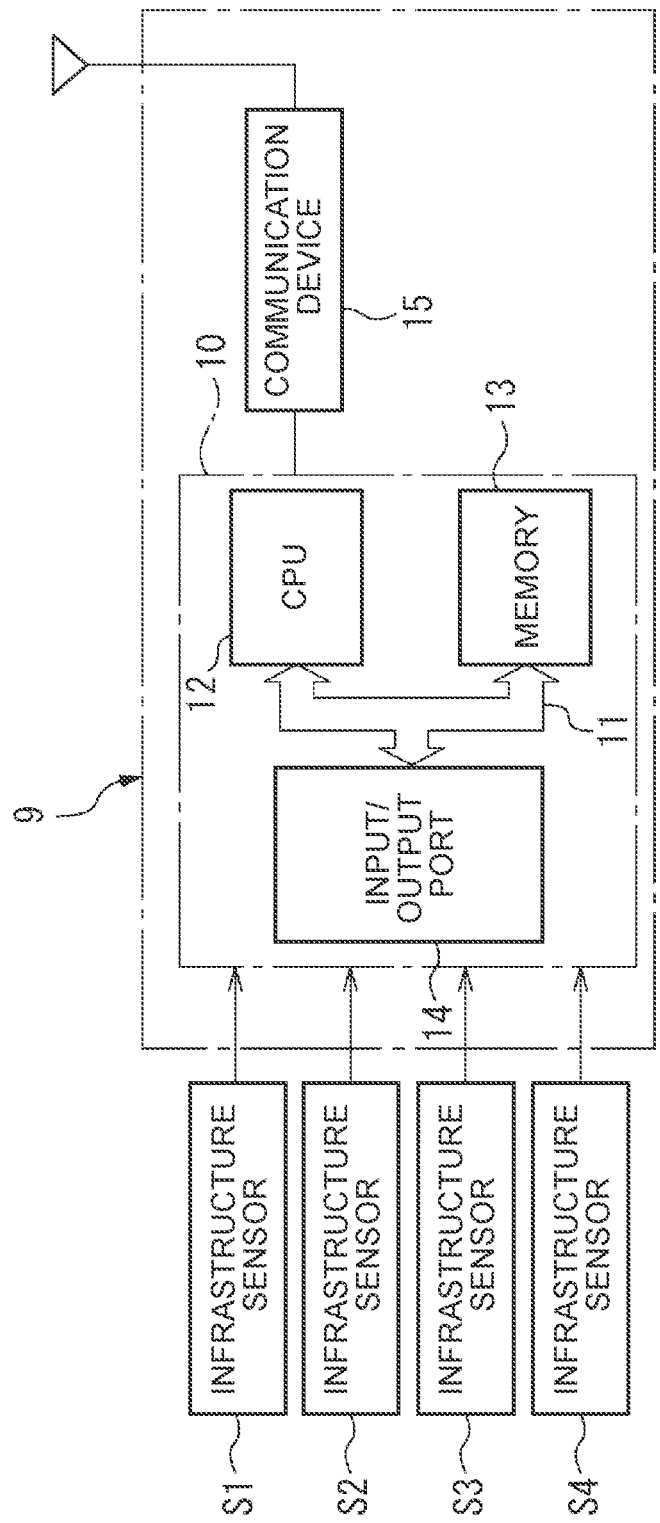
FIG. 3 is a diagram graphically illustrating a parking lot management server.

FIG. 3 shows the entry and leaving management server 9 shown in FIG. 1. As shown in FIG. 3, an electronic control unit 10 is installed in the entry and leaving management server 9. The electronic control unit 10 is composed of a digital computer, and includes a central processing unit (CPU) (microprocessor) 12, a memory 13 composed of a read-only memory (ROM) and a random access memory (RAM), and an input/output port 14 that are connected to each other by a bidirectional bus 11. As shown in FIG. 3, the image signals captured by the infrastructure sensors S1, S2, S3, and S4 are input to the electronic control unit 10. Further, the map data of the parking lot 1 is stored in the memory 13 of the electronic control unit 10.

The infrastructure sensors S1, S2, S3, and S4 may break down during use, and even when they do not break down, the lens of the camera may become dirty due to deterioration or other reasons, and the image taken by the camera may become unclear. As described above, when an abnormality such as a failure occurs or the image becomes unclear in any of the infrastructure sensors S1, S2, S3, and S4, it becomes difficult to set a travel route for a vehicle that can reach the boarding and alighting place 4 from the parking space 3 where the vehicle is parked without coming into contact with other vehicles and pedestrians. This causes a problem that the automatic parking service has to be stopped.

Therefore, in the embodiment according to the present disclosure, when an abnormality occurs in any of the infrastructure sensors S1, S2, S3, and S4, an alternative detector of any of the infrastructure sensors S1, S2, S3, and S4 in which an abnormality occurs is prepared in advance, or a detector to be used as an alternative detector is determined in advance, and the alternative detector is replaced by any of the infrastructure sensors S1, S2, S3, and S4 in which an abnormality occurs, so that the detection range of any of the infrastructure sensors S1, S2, S3, and S4 in which an abnormality occurs is detected. In the embodiment according to the present disclosure, a mobile body including a peripheral detection sensor is used as the alternative detector. In this case, in the embodiment according to the present disclosure, an autonomous vehicle or a drone is used as the mobile body.

FIG. 4A graphically shows an example of an autonomous vehicle 20 used as the mobile body. Referring to FIG. 4A, the numeral 21 indicates a vehicle drive unit for applying a driving force to drive wheels of the vehicle 20, the numeral 22 indicates a braking device for braking the vehicle 20, the numeral 23 indicates a steering device for steering the vehicle 20, and the numeral 24 indicates an electronic control unit mounted in the vehicle 20. As shown in FIG. 4A, the electronic control unit 24 is composed of a digital computer, and includes a CPU (microprocessor) 26, a memory 27 composed of a ROM and a RAM, and an input/output port 28 that are connected to each other by a bidirectional bus 25.

On the other hand, as shown in FIG. 4A, the vehicle 20 is provided with various sensors 30 necessary for the vehicle 20 to perform autonomous driving, that is, a sensor for detecting the state of the vehicle 20 and a peripheral detection sensor for detecting the periphery of the vehicle 20. In this case, an acceleration sensor, a speed sensor, and an azimuth angle sensor are used as the sensors for detecting the state of the vehicle 20, and an on-board camera for capturing images of the front, the side, and the rear of the vehicle 20 or the like, light detection and ranging (LIDAR), a radar, and the like are used as the peripheral detection sensors for detecting the periphery of the vehicle 20. In this case, as one of the peripheral detection sensors, an abnormality-responding peripheral detection sensor, for example, an abnormality-responding camera is installed, and the abnormality-responding peripheral detection sensor, for example, the abnormality-responding camera is installed, for example, at a high position on the roof of the vehicle 20 such that the detection range of any of the infrastructure sensors S1, S2, S3, and S4 in which an abnormality occurs can be detected.

Further, the vehicle 20 is provided with a Global Navigation Satellite System (GNSS) receiving device 31, a map data storage device 32, a navigation device 33, and an operation unit 34 for performing various operations. The GNSS receiving device 31 can detect the current position of the vehicle 20 (for example, the latitude and longitude of the vehicle 20) based on the information obtained from a plurality of artificial satellites. Therefore, the current position of the vehicle 20 can be acquired by the GNSS receiving device 31. As the GNSS receiving device 31, for example, a global positioning system (GPS) receiving device is used. On the other hand, the map data storage device 32 stores map data and the like necessary for the vehicle 20 to perform autonomous driving. These various sensors 30, the GNSS receiving device 31, the map data storage device 32, the navigation device 33, and the operation unit 34 are connected to the electronic control unit 24. Further, the vehicle 20 is provided with a communication device 35 for communicating with the entry and leaving management server 9, and as shown in FIG. 3, the entry and leaving management server 9 is provided with a communication device 15 for communicating with the vehicle 20.

In the example shown in FIG. 4A, the vehicle drive unit 21 is composed of an electric motor driven by a secondary battery or an electric motor driven by a fuel cell, and the drive wheels are driven and controlled by the electric motor described above in accordance with an output signal from the electronic control unit 24. Further, the braking control of the vehicle 20 is executed by the braking device 22 in accordance with the output signal from the electronic control unit 24. The steering control of the vehicle 20 is executed by the steering device 23 in accordance with the output signal from the electronic control unit 24.

On the other hand, FIG. 4B graphically shows an example of a drone 40 used as the mobile body. Referring to FIG. 4B, the drone 40 includes a control device 41 that allows the drone 40 to fly based on a command from the entry and leaving management server 9. The control device 41 includes an electronic control unit, a GNSS receiving device, a map data storage device, a navigation device, and a communication device similar to the electronic control unit 24, the GNSS receiving device 31, the map data storage device 32, the navigation device 33, and the communication device 35, respectively, shown in FIG. 4A. Further, the control device 41 includes a drive device for driving a plurality of propellers, and the control device 41 further includes various sensors necessary for the drone 40 to fly automatically, that is, a sensor for detecting the state of the drone 40 and a peripheral detection sensor for detecting the periphery of the drone 40.

Similar to the autonomous vehicle 20 shown in FIG. 4A, an acceleration sensor, a speed sensor, and an azimuth angle sensor are used as the sensors for detecting the state of the drone 40, and a camera that captures images of the peripheral direction, the upward direction, and the downward direction of the drone 40, a LIDAR, a radar, and the like are used as the peripheral detection sensors for detecting the periphery of the drone 40. In this case, as one of the peripheral detection sensors, an abnormality-responding peripheral detection sensor, for example, an abnormality-responding camera is installed, and the abnormality-responding peripheral detection sensor, for example, the abnormality-responding camera is installed, for example, on the lower side of the drone 40, as indicated by the reference numeral 42, such that the detection range of any of the infrastructure sensors S1, S2, S3, and S4 in which an abnormality occurs can be detected. As shown by the broken line in FIG. 1, the autonomous vehicle 20 used as the mobile body or the drone 40 used as the mobile body is disposed in a standby position outside the parking lot 1, or is disposed in a standby position inside the parking lot 1.

Whether an abnormality has occurred in any of the infrastructure sensors S1, S2, S3, and S4 can be determined, for example, by whether the output current of any of the infrastructure sensors S1, S2, S3, and S4 is lower than the threshold value. The abnormality in such an infrastructure sensors S1, S2, S3, or S4 is detected in an abnormality detection unit provided in each infrastructure sensor S1, S2, S3, and S4, or in an abnormality detection unit provided in the entry and leaving management server 9. When the abnormality is detected in the abnormality detection unit provided in each infrastructure sensor S1, S2, S3, and S4, information indicating that the abnormality has occurred in the corresponding infrastructure sensor S1, S2, S3, and S4 is notified to the entry and leaving management server 9. As described above, in the embodiment according to the present disclosure, the occurrence of the abnormalities in the infrastructure sensors S1, S2, S3, and S4 is constantly monitored by the entry and leaving management server 9.

Next, the outline of the automatic parking lot management according to the present disclosure will be described by presenting a case where an abnormality occurs in the infrastructure sensor S1 as an example. When an abnormality occurs in the infrastructure sensor S1, it becomes difficult for the infrastructure sensor S1 to detect the detection range, that is, the range surrounded by the band-shaped diagonal line portion in FIG. 1. Therefore, in this case, in order to detect the detection range of the infrastructure sensor S1 by the peripheral detection sensor of the mobile body, for example, the abnormality-responding peripheral detection sensor of the autonomous vehicle 20, for example, the abnormality-responding camera, or the abnormality-responding peripheral detection sensor of the drone 40, for example, the abnormality-responding camera, the autonomous vehicle 20 or the drone 40 is moved to a position at which the abnormality-responding peripheral detection sensor of the autonomous vehicle 20 or the drone 40, for example, the abnormality-responding camera, can detect the detection range of the infrastructure sensor S1.

To describe the above using a specific example, when an abnormality occurs in the infrastructure sensor S1, for example, the autonomous vehicle 20 is moved to a position indicated by the reference numeral 20a in FIG. 1. In FIG. 1, the angle range that can be detected by the abnormality-responding peripheral detection sensor of the autonomous vehicle 20a that has moved to the position, for example, the abnormality-responding camera, is shown by $\theta$s. Therefore, it can be seen from FIG. 1 that the detection range of the infrastructure sensor S1 can be detected by the abnormality-responding peripheral detection sensor of the autonomous vehicle 20*a* that has moved to the position, for example, the abnormality-responding camera. On the other hand, when the drone 40 is used, the drone 40 is made to fly to the vicinity of the infrastructure sensor S1 and then hovered in the vicinity of the infrastructure sensor S1. In this case, the drone 40 is hovered in the vicinity of the infrastructure sensor S1 such that the detection range of the infrastructure sensor S1 can be continuously detected by the abnormality-responding peripheral detection sensor of the drone 40, for example, the abnormality-responding camera.

On the other hand, the autonomous vehicles 6, 7, and 8 shown in FIG. 1 have the same functions as the autonomous vehicle 20 shown in FIG. 4A, and therefore, the autonomous vehicles 6, 7, and 8 parked in the parking lot can also be used as the mobile body. In this case, the autonomous vehicle 6, 7, or 8 is moved to the position indicated by the reference numeral 20*a* in FIG. 1. Further, in this case, when a certain autonomous vehicle is parked at a place indicated by the reference numeral 20*a* in FIG. 1, the parked autonomous vehicle can also be used as the mobile body. In any case, the autonomous vehicles 6, 7, 8, and the like can be used as the mobile body only when the detection range of the infrastructure sensor S1 can be detected by the peripheral detection sensor of the autonomous vehicle 6, 7, 8 and the like. On the other hand, in the embodiment according to the present disclosure, when the autonomous vehicles 6, 7, 8 and the like parked in the parking lot are used as the mobile body, a reward is given to the owners of the autonomous vehicles 6, 7, 8 and the like.

Figure 5A:
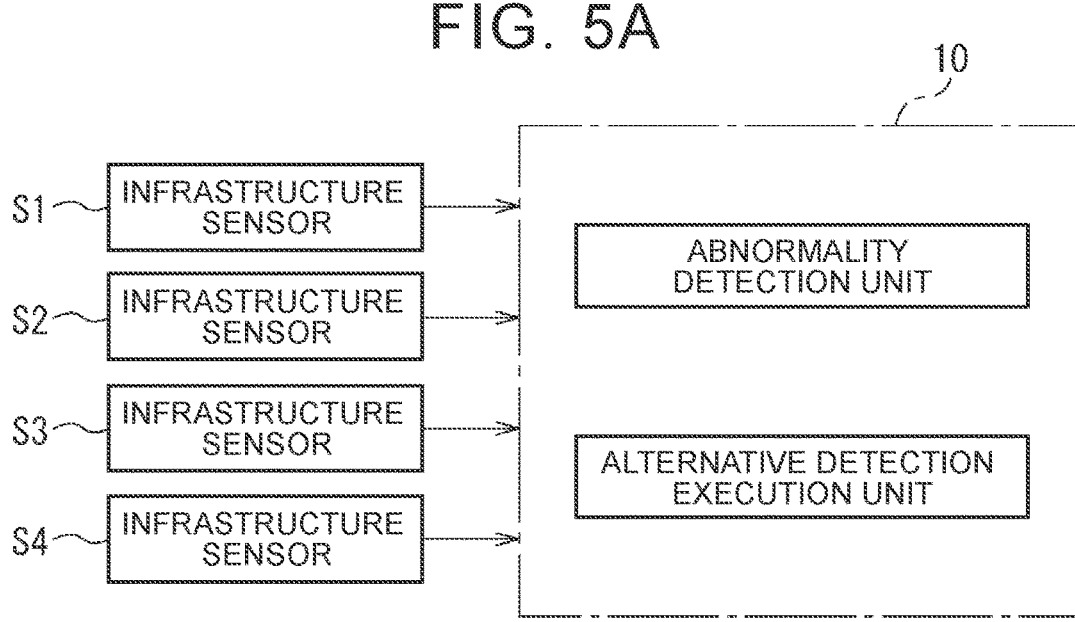
FIG. 5A is a functional configuration diagram of an embodiment according to the present disclosure.
Figure 5B:
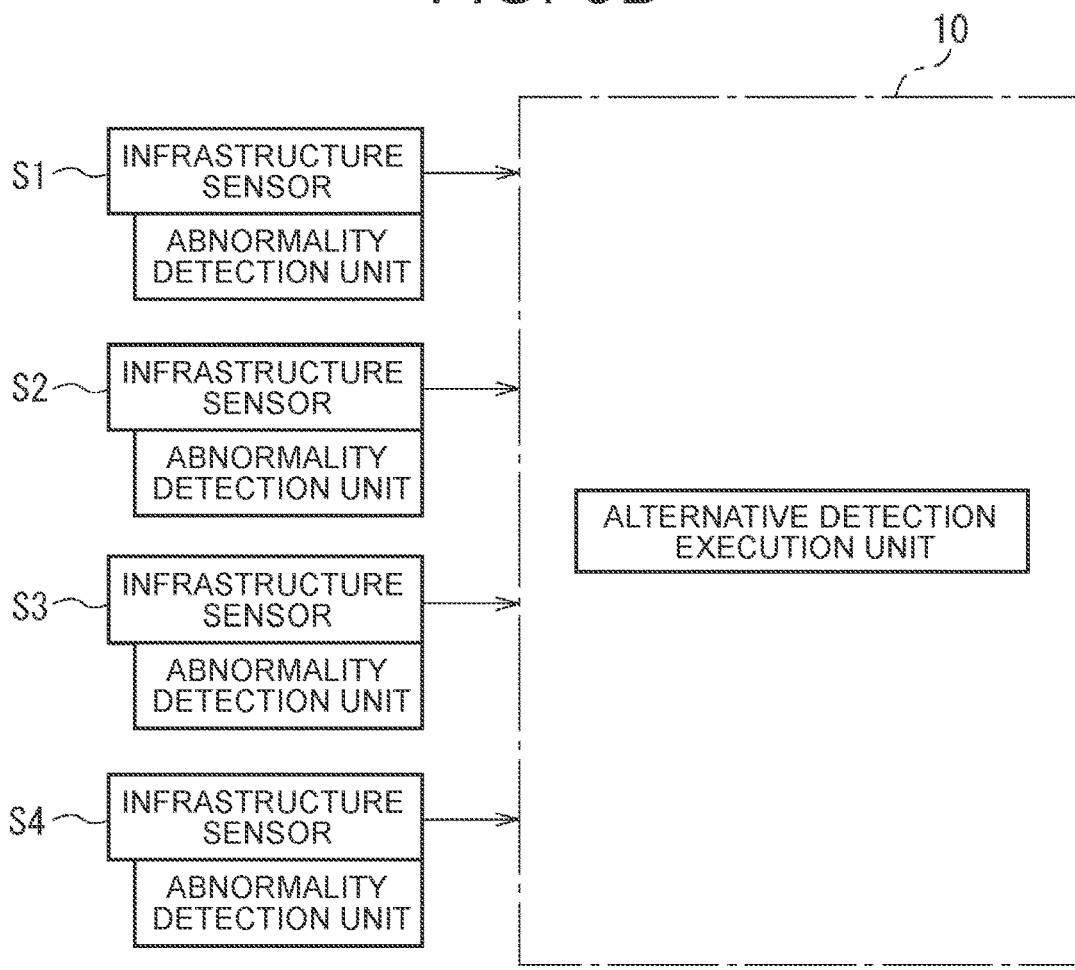
FIG. 5B is a functional configuration diagram of an embodiment according to the present disclosure.

As described above, in the embodiment according to the present disclosure, as shown in the functional configuration diagram of FIG. 5A or the functional configuration diagram of FIG. 5B, the automatic parking lot management system includes the infrastructure sensors S1, S2, S3, and S4 for detecting a preset range in the parking lot 1, in which the mobile body including the peripheral detection sensor is used, and the mobile body can be moved to a detectable position at which the peripheral detection sensor of the mobile body is able to detect the detection ranges of the infrastructure sensors S1, S2, S3, and S4, and further includes the abnormality detection unit for detecting the abnormalities in the infrastructure sensors S1, S2, S3, and S4, and an alternative detection execution unit for moving the mobile body to the detectable position to cause the peripheral detection sensor to detect the detection ranges of the infrastructure sensors S1, S2, S3, and S4 when the abnormalities in the infrastructure sensors S1, S2, S3, and S4 are detected. In this case, in the example shown in FIG. 5A, the electronic control unit 10 of the entry and leaving management server 9 constitutes the abnormality detection unit and the alternative detection execution unit, and in the example shown in FIG. 5B, the electronic control unit 10 of the entry and leaving management server 9 constitutes the alternative detection execution unit.

Further, in the embodiment according to the present disclosure, an automatic parking lot management method is provided in which the abnormalities in the infrastructure sensors S1, S2, S3, and S4 for detecting the preset range in the parking lot 1 are detected, the mobile body including the peripheral detection sensor is used, the mobile body is able to be moved to a detectable position at which the peripheral detection sensor of the mobile body is able to detect the detection range of the infrastructure sensors S1, S2, S3, and S4, and when the abnormalities in the infrastructure sensor S1, S2, S3, and S4 are detected, the mobile body is moved to the detectable position to cause the peripheral detection sensor to detect the detection range of the infrastructure sensors S1, S2, S3, and S4.

Further, in the embodiment according to the present disclosure, a program for controlling the automatic parking lot management system is provided, the automatic parking lot management system including the infrastructure sensors S1, S2, S3, and S4 for detecting the preset range in the parking lot 1, in which the mobile body including the peripheral detection sensor is used, and the mobile body is able to be moved to a detectable position at which the peripheral detection sensor of the mobile body is able to detect the detection range of the infrastructure sensors S1, S2, S3, and S4, the program for causing a computer to move the mobile body to the detectable position to cause the peripheral detection sensor to detect the detection range of the infrastructure sensors S1, S2, S3, and S4 when the abnormalities in the infrastructure sensor S1, S2, S3, and S4 are detected. The program is stored in a storage medium.

Figure 6:
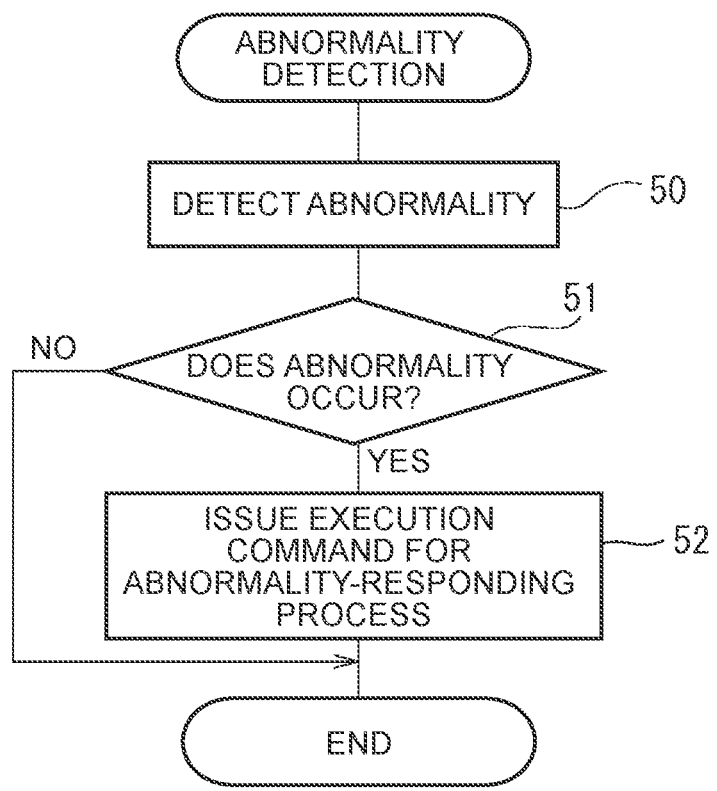
FIG. 6 is a flowchart for detecting an abnormality.

FIG. 6 shows an abnormality detection routine for detecting an abnormality in each infrastructure sensor S1, S2, S3, and S4. In the example shown in FIG. 5A, this abnormality detection routine is repeatedly executed in the electronic control unit 10 of the entry and leaving management server 9, and in the example shown in FIG. 5B, this abnormality detection routine is repeatedly executed in each infrastructure sensor S1, S2, S3, and S4.

Referring to FIG. 6, first, in step 50, an abnormality in each infrastructure sensor S1, S2, S3, and S4 is detected. Next, in step 51, it is determined whether an abnormality occurs in any of the infrastructure sensors S1, S2, S3, and S4, and when it is determined that an abnormality occurs in any of the infrastructure sensors S1, S2, S3, and S4, the process proceeds to step S2, and an execution command for the abnormality-responding process is issued. In the example shown in FIG. 5B, when the execution command for the abnormality-responding process is issued, the execution command for the abnormality-responding process is notified to the entry and leaving management server 9.

Figure 7:
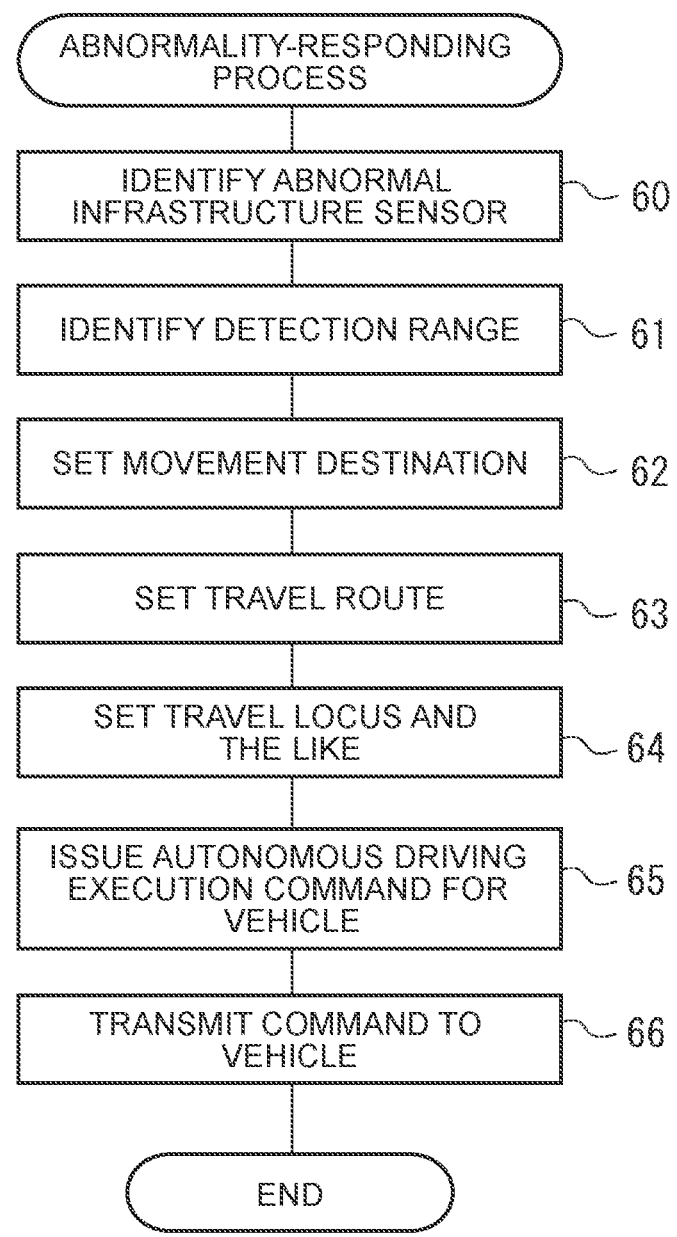
FIG. 7 is a flowchart for executing an embodiment of an abnormality-responding process.
Figure 8:
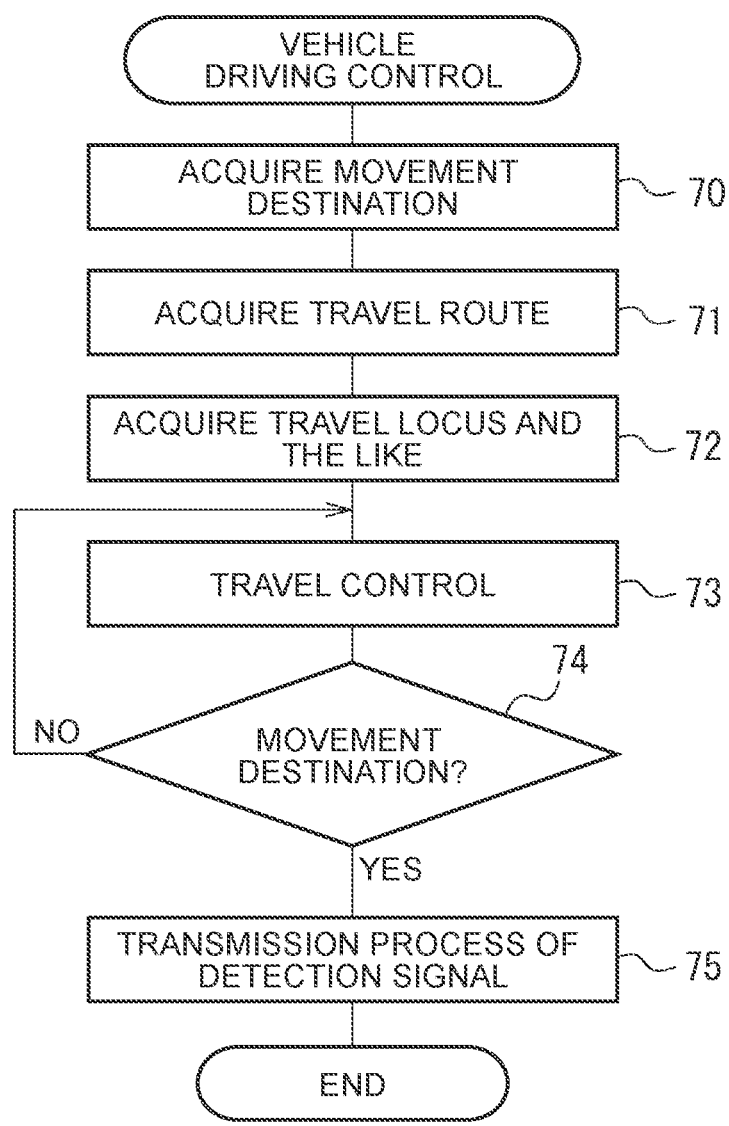
FIG. 8 is a flowchart for performing vehicle driving control.

In the embodiment according to the present disclosure, when the execution command for the abnormality-responding process is issued, the abnormality-responding processing routine is executed in the electronic control unit 10 of the entry and leaving management server 9. FIGS. 7 and 8 each show an abnormality-responding processing routine when the autonomous vehicle 20 is used as the mobile body, FIGS. 9 and 10 each show an abnormality-responding processing routine when the drone 40 is used as the mobile body, and FIGS. 11 and 12 each show an abnormality-responding processing routine when the parked autonomous vehicles 6, 7, and 8 are used as the mobile bodies.

First, referring to FIGS. 7 and 8 each showing the abnormality-responding processing routine when the autonomous vehicle 20 is used as the mobile body, first, in step 60, based on the abnormality detection result in the abnormality detection routine in FIG. 6, of the infrastructure sensors S1, S2, S3, and S4, an abnormal infrastructure sensor is identified. Next, in step 61, the detection range of the abnormal infrastructure sensor is identified. In this case, for example, assuming that the abnormal infrastructure sensor is the infrastructure sensor S1, in step 61, based on the map data of the parking lot 1 stored in the memory 43, the detection range of the infrastructure sensor S1 on the plane map of the parking lot 1 as shown in FIG. 1 is identified. Next, in step 62, based on the map data of the parking lot 1 stored in the memory 43, the position of the autonomous vehicle 20 that can detect the detection range of the infrastructure sensor S1 by the abnormality-responding peripheral detection sensor of the autonomous vehicle 20, for example, the abnormality-responding camera, is set as a movement destination.

Next, in step 63, a travel route from the standby position of the autonomous vehicle 20 to the set movement destination is set based on the map data of the parking lot 1 stored in the memory 43. Next, in step 64, the travel locus and the travel speed of the autonomous vehicle 20 at which the autonomous vehicle 20 does not come into contact with other vehicles or pedestrians are determined on the plane map of the parking lot 1 updated based on the detection signals of the normal infrastructure sensors S2, S3, and S4. Next, in step 65, an autonomous driving execution command for the autonomous vehicle 20 is issued, and then in step 66, the set movement destination, travel route, travel locus, and travel speed, and the autonomous driving execution command are transmitted to the autonomous vehicle 20 from the entry and leaving management server 9.

When the autonomous driving execution command is transmitted from the entry and leaving management server 9 to the autonomous vehicle 20, the autonomous driving control of the autonomous vehicle 20 is started. FIG. 8 shows a vehicle driving control routine for performing autonomous driving control of the autonomous vehicle 20, and this routine is repeatedly executed in the electronic control unit 24 mounted on the vehicle 20.

Referring to FIG. 8, first, in step 70, the movement destination set in the entry and leaving management server 9 is acquired, and then in step 71, the travel route set in the entry and leaving management server 9 is acquired. In step 72, the travel locus and the travel speed set in the entry and leaving management server 9 are acquired. Next, in step 73, the travel control for the autonomous vehicle 20 is performed along the set travel locus so as not to come into contact with other vehicles and pedestrians based on the detection result of the peripheral detection sensor such as a camera for capturing an image of the front or the like of the autonomous vehicle 20, a LIDAR, and a radar. Next, in step 74, it is determined whether the autonomous vehicle 20 has reached the movement destination. When it is determined that the autonomous vehicle 20 has not reached the movement destination, the process returns to step 73, and the autonomous driving of the autonomous vehicle 20 is continued. On the other hand, when it is determined in step 74 that the autonomous vehicle 20 has reached the movement destination, the process proceeds to step 75, and the image signal captured by the abnormality-responding peripheral detection sensor of the autonomous vehicle 20, for example, the abnormality-responding camera, is continuously transmitted to the entry and leaving management server 9.

When the image signal captured by the abnormality-responding peripheral detection sensor of the autonomous vehicle 20, for example, the abnormality-responding camera, is transmitted to the entry and leaving management server 9, in the entry and leaving management server 9, based on the image signal captured by the abnormality-responding peripheral detection sensor of the autonomous vehicle 20, for example, the abnormality-responding camera, and the image signal captured by the normal infrastructure sensors S2, S3, and S4, an entry and leaving service of the autonomous vehicle is performed.

Figure 9:
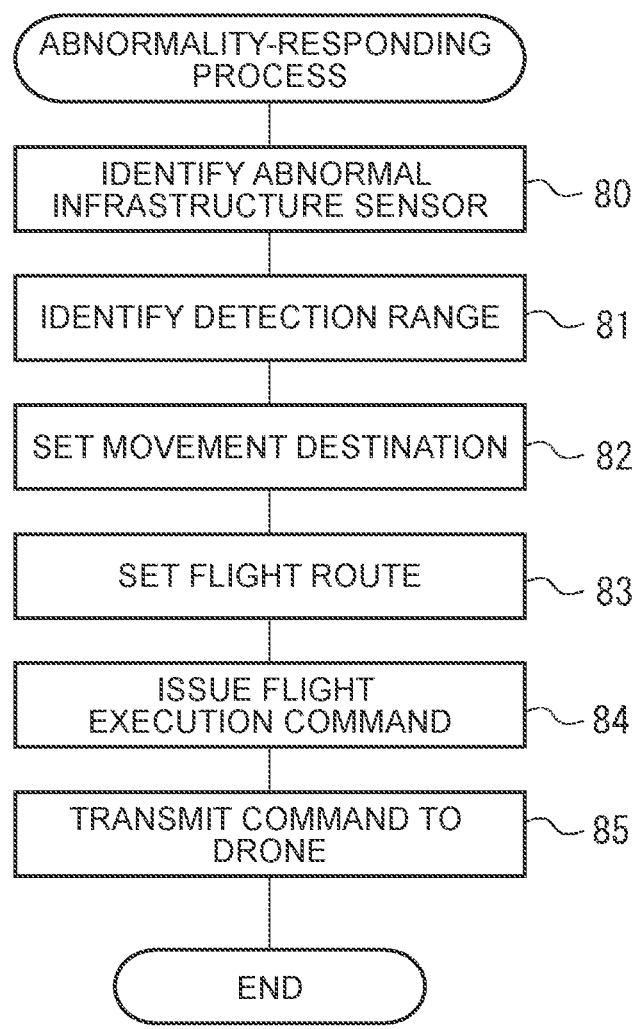
FIG. 9 is a flowchart for executing another embodiment of the abnormality-responding process.

Next, referring to FIGS. 9 and 10 each showing the abnormality-responding processing routine when the drone 40 is used as the mobile body, first, in step 80, based on the abnormality detection result in the abnormality detection routine in FIG. 6, of the infrastructure sensors S1, S2, S3, and S4, an abnormal infrastructure sensor is identified. Next, in step 81, the detection range of the abnormal infrastructure sensor is identified. In this case, for example, assuming that the abnormal infrastructure sensor is the infrastructure sensor S1, in step 81, based on the map data of the parking lot 1 stored in the memory 43, the detection range of the infrastructure sensor S1 on the plane map of the parking lot 1 as shown in FIG. 1 is identified. Next, in step 82, based on the map data of the parking lot 1 stored in the memory 43, the position of the drone 40 that can detect the detection range of the infrastructure sensor S1 by the abnormality-responding peripheral detection sensor of the drone 40, for example, the abnormality-responding camera, is set as a movement destination.

Next, in step 83, a flight route from the standby position of the drone 40 to the set movement destination is set based on the map data of the parking lot 1 stored in the memory 43. Next, in step 84, a flight execution command for the drone 40 is issued, and then in step 85, the set movement destination and flight route, and the flight execution command are transmitted from the entry and leaving management server 9 to the drone 40.

When the flight execution command is transmitted from the entry and leaving management server 9 to the drone 40, the autonomous flight control of the drone 40 is started. FIG. 10 shows a flight control routine for performing autonomous flight control of the drone 40, and this routine is repeatedly executed in the electronic control unit of the control device 41 mounted on the drone 40.

Referring to FIG. 10, first, in step 90, the movement destination set in the entry and leaving management server 9 is acquired, and then in step 91, the flight route set in the entry and leaving management server 9 is acquired. Next, in step 92, the flight control for the drone 40 is performed along the set flight route so as not to come into contact with other vehicles and structures based on the detection result of the peripheral detection sensor such as a camera for capturing an image of the peripheral direction, the upward direction, and the downward direction of the drone 40, a LIDAR, and a radar. Next, in step 93, it is determined whether the drone 40 has reached the movement destination. When it is determined that the drone 40 has not reached the movement destination, the process returns to step 92 and the autonomous flight of the drone 40 is continued. On the other hand, when it is determined in step 93 that the drone 40 has reached the movement destination, the process proceeds to step 94, and hovering control for maintaining the drone 40 at the movement destination is performed. Next, in step 95, the image signal captured by the abnormality-responding peripheral detection sensor of the drone 40, for example, the abnormality-responding camera, is continuously transmitted to the entry and leaving management server 9.

When the image signal captured by the abnormality-responding peripheral detection sensor of the drone 40, for example, the abnormality-responding camera, is transmitted to the entry and leaving management server 9, in the entry and leaving management server 9, based on the image signal captured by the abnormality-responding peripheral detection sensor of the drone 40, for example, the abnormality-responding camera, and the image signal captured by the normal infrastructure sensors S2, S3, and S4, an entry and leaving service of the autonomous vehicle is performed.

Next, referring to FIGS. 11 and 12 each showing the abnormality-responding processing routine when the parked autonomous vehicles 6, 7, and 8 are used as the mobile body, first, in step 100, based on the abnormality detection result in the abnormality detection routine in FIG. 6, of the infrastructure sensors S1, S2, S3, and S4, an abnormal infrastructure sensor is identified. Next, in step 101, the detection range of the abnormal infrastructure sensor is identified. In this case, for example, assuming that the abnormal infrastructure sensor is the infrastructure sensor S1, in step 101, based on the map data of the parking lot 1 stored in the memory 43, the detection range of the infrastructure sensor S1 on the plane map of the parking lot 1 as shown in FIG. 1 is identified. Next, in step 102, based on the map data of the parking lot 1 stored in the memory 43, the position of the autonomous vehicle that can detect the detection range of the infrastructure sensor S1 by the peripheral detection sensor of the autonomous vehicle is set as a movement destination.

Next, in step 103, of the parked autonomous vehicles 6, 7, and 8, autonomous vehicles that can detect the detection range of the infrastructure sensor S1 by the peripheral detection sensor of each autonomous vehicle 6, 7, and 8, for example, the camera, that is, autonomous vehicles that can be used for detecting the detection range of the infrastructure sensor S1 are searched. Next, in step 104, of the autonomous vehicles that can be used for detecting the detection range of the infrastructure sensor S1 among the parked autonomous vehicles 6, 7, and 8, an autonomous vehicle that can capture an image of the detection range of the infrastructure sensor S1 by the peripheral detection sensor, for example, the camera, most appropriately is determined as a vehicle to be used, that is, a usage vehicle. When the usage vehicle is determined, the process proceeds to step 105.

Next, in step 105, a travel route from the position where the usage vehicle is parked to the set movement destination is set based on the map data of the parking lot 1 stored in the memory 43. Next, in step 106, a travel locus and a travel speed of the usage vehicle at which the usage vehicle does not come into contact with other vehicles or pedestrians are determined on the plane map of the parking lot 1 updated based on the detection signals of the normal infrastructure sensors S2, S3, and S4. Next, in step 107, an autonomous driving execution command for the usage vehicle is issued, and then in step 108, the set movement destination, travel route, travel locus, and travel speed, and the autonomous driving execution command are transmitted to the usage vehicle from the entry and leaving management server 9.

When the autonomous driving execution command is transmitted from the entry and leaving management server 9 to the usage vehicle, the autonomous driving control of the usage vehicle is started. FIG. 12 shows a vehicle driving control routine for performing autonomous driving control of the usage vehicle, and this routine is repeatedly executed in the electronic control unit mounted on the usage vehicle.

Referring to FIG. 12, first, in step 110, the movement destination set in the entry and leaving management server 9 is acquired, and then in step 111, the travel route set in the entry and leaving management server 9 is acquired. In step 112, the travel locus and the travel speed set in the entry and leaving management server 9 are acquired. Next, in step 113, the travel control for the usage vehicle is performed along the set travel locus so as not to come into contact with other vehicles and pedestrians based on the detection result of the peripheral detection sensor such as a camera for capturing an image of the front or the like of the usage vehicle, a LIDAR, and a radar. Next, in step 114, it is determined whether the usage vehicle has reached the movement destination. When it is determined that the usage vehicle has not reached the movement destination, the process returns to step 113, and the autonomous driving of the usage vehicle is continued. On the other hand, when it is determined in step 114 that the usage vehicle has reached the movement destination, the process proceeds to step 115, and the image signal captured by the peripheral detection sensor of the usage vehicle, for example, the camera, is continuously transmitted to the entry and leaving management server 9. Then, in step 116, a reward is given to the owner of the usage vehicle. As the form of giving the reward, various forms such as giving points or discounting the parking fee are adopted.

When the image signal captured by the peripheral detection sensor of the usage vehicle is transmitted to the entry and leaving management server 9, in the entry and leaving management server 9, based on the image signal captured by the peripheral detection sensor of the usage vehicle and the image signal captured by the normal infrastructure sensors S2, S3, and S4, an entry and leaving service of the autonomous vehicle is performed.

What is claimed is:

1. An automatic parking lot management system comprising:
   infrastructure sensors, each of the infrastructure sensors detecting a preset range in a parking lot;
   a drone including a peripheral detection sensor, wherein the drone is able to be moved to a detectable position at which the peripheral detection sensor of the drone is able to detect a detection range of each of the infrastructure sensors; and
   an electronic control unit including a processor configured to:
   detect whether an abnormality exists in any of the infrastructure sensors,
   based upon the detection of the abnormality in one of the infrastructure sensors, determine the detection range of the one of the infrastructure sensors that has the abnormality; and
   cause the drone including the peripheral detection sensor to move to a movement destination, the movement destination being a position at which the peripheral detection sensor of the drone is able to detect the detection range allocated to the one of the infrastructure sensors that has the abnormality.

2. The automatic parking lot management system according to claim 1, wherein the electronic control unit is a component of an entry and leaving management server that manages entry and leaving of a vehicle in the parking lot.

3. The automatic parking lot management system according to claim 1, wherein the electronic control unit is configured to perform hovering control of the drone so that the drone hovers over the movement destination while the abnormality in one of the infrastructure sensors is detected.

4. An automatic parking lot management method comprising:
   detecting whether an abnormality exists in any one of a plurality of infrastructure sensors for detecting a preset range in a parking lot;
   based upon the detection of the abnormality in one of the infrastructure sensors, determining a detection range of the one of the infrastructure sensors that has the abnormality; and
   causing a drone including a peripheral detection sensor to move to a movement destination, the movement destination being a position at which the peripheral detection sensor of the drone is able to detect the detection range allocated to the one of the infrastructure sensors that has the abnormality.

5. The automatic parking lot management method according to claim 4, further comprising performing hovering control of the drone so that the drone hovers over the movement destination while the abnormality in one of the infrastructure sensors is detected.

6. A non-transitory storage medium storing a program for controlling an automatic parking lot management system that includes infrastructure sensors, each of the infrastructure sensors for detecting a preset range in a parking lot, the program causing a computer to:
   detect whether an abnormality exists in any of the infrastructure sensors;
   based upon the detection of the abnormality in one of the infrastructure sensors, determine a detection range of the one of the infrastructure sensors that has the abnormality; and
   cause a drone including a peripheral detection sensor to move to a movement destination, the movement destination being a position at which the peripheral detection sensor of the drone is able to detect the detection range allocated to the one of the infrastructure sensors that has the abnormality.

7. The non-transitory storage medium according to claim 6, further comprising performing hovering control of the drone so that the drone hovers over the movement destination while the abnormality in one of the infrastructure sensors is detected.

* * * * *